United States Patent
Tang et al.

(10) Patent No.: US 7,848,320 B2
(45) Date of Patent: Dec. 7, 2010

(54) METHOD AND SYSTEM OF STORAGE AREA NETWORK SWITCH ADDRESSING

(75) Inventors: Ren-Yi Tang, Hsinchu (TW); Yi-Lung Lien, Hsinchu (TW); Xavier Tsai, Chiayi (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1483 days.

(21) Appl. No.: 10/863,884

(22) Filed: Jun. 8, 2004

(65) Prior Publication Data

US 2005/0271052 A1    Dec. 8, 2005

(51) Int. Cl.
*H04L 12/28* (2006.01)
(52) U.S. Cl. ............................................. 370/389
(58) Field of Classification Search ................ 370/229, 370/230, 389, 392, 395.2, 395.3, 396, 474–476, 370/212–221, 225, 227, 228, 231, 235, 254, 370/466, 470–472; 709/226–229, 245; 707/1–9, 707/202
See application file for complete search history.

(56) References Cited

U.S. PATENT DOCUMENTS

| | | | |
|---|---|---|---|
| 4,001,786 A | 1/1977 | Boehm | |
| 4,241,238 A * | 12/1980 | Strand | 379/142.01 |
| 5,296,641 A * | 3/1994 | Stelzel | 84/602 |
| 5,361,298 A * | 11/1994 | Ruel et al. | 379/242 |
| 6,421,723 B1 | 7/2002 | Tawil | |
| 6,483,850 B1 * | 11/2002 | Chui et al. | 370/466 |
| 6,647,476 B2 * | 11/2003 | Nagasawa et al. | 711/165 |
| 6,775,230 B1 * | 8/2004 | Watanabe et al. | 370/228 |
| 6,944,158 B1 * | 9/2005 | Wilson et al. | 370/392 |
| 6,961,775 B2 * | 11/2005 | Rao | 709/228 |
| 6,985,490 B2 * | 1/2006 | Czeiger et al. | 370/401 |
| 7,016,299 B2 * | 3/2006 | Kashyap | 370/218 |
| 7,301,949 B2 * | 11/2007 | Eriksson | 370/392 |
| 7,451,208 B1 * | 11/2008 | Bakke et al. | 709/224 |
| 2002/0034178 A1 * | 3/2002 | Schmidt et al. | 370/386 |
| 2004/0158652 A1 * | 8/2004 | Obara | 710/5 |

FOREIGN PATENT DOCUMENTS

TW    588248 B    5/2004

OTHER PUBLICATIONS

NCIT 321-200x, Fibre Channel Switch Fabric -2 (FC-SW-2), NCITS working draft propsed American Standard for Inforamtion Technology, Oct. 27, 2000; Rev. 4.8, pp. 1-18.*

* cited by examiner

*Primary Examiner*—Derrick W Ferris
*Assistant Examiner*—Mohammad Anwar
(74) *Attorney, Agent, or Firm*—Haynes and Boone, LLP

(57) ABSTRACT

A method of storage area network switch addressing is provided which includes disconnecting from a first port of a switch addressable by an address of a first address format, connecting to a second port of the switch addressable by a second address format, and accessing the second port using the address.

10 Claims, 5 Drawing Sheets

METHOD AND SYSTEM OF STORAGE AREA NETWORK SWITCH ADDRESSING

BACKGROUND

A storage area network (SAN) is a specialized, high-speed network. Usually separate and distinct from an enterprise's local area network (LAN) and wide area network (WAN), one purpose of a storage area network is to handle large amounts of data traffic between servers and storage devices, without reducing the bandwidth resources of the local area network or wide area network. Usually connected by Fibre Channel, a high speed transmission technology, a storage area network is a dedicated, platform-independent network that enables fast data access. A storage area network may also include one or more hubs or switches to route traffic.

SUMMARY

A method comprises disconnecting from a first port of a switch addressable by an address of a first address format, connecting to a second port of the switch addressable by a second address format, and accessing the second port using the address.

A network system comprises a network comprising a plurality of computers, data storage devices, a first access path between the network and the data storage devices comprising a plurality of switches, at least one of the switches addressable using a first address format, and a second access path between the network and the data storage devices comprising a plurality of switches, at least one of the switches addressable using a second address format.

A method comprises logically stopping an access path from a host to a switch in the access path, disconnecting from ports of the switch addressable by a first addressing format and connecting to ports addressable by a second addressing format, and logically enabling the access path and addressing the ports of the switch using the second addressing format.

DESCRIPTION

The present disclosure relates generally to the field of computer networks and, more particularly, to a method of enabling a new addressing mode in a storage area network (SAN) environment.

Figure 1:
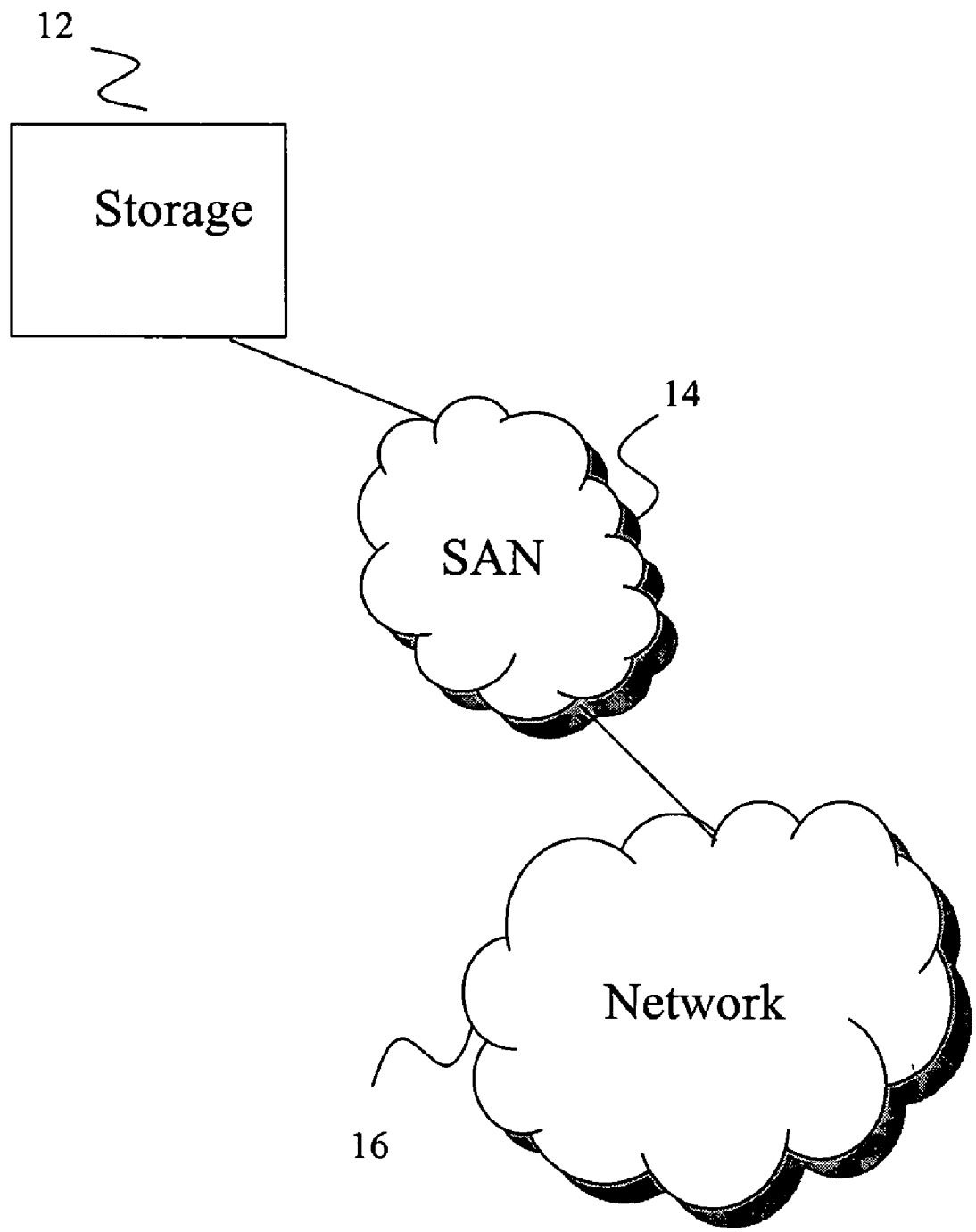
FIG. 1 is a simplified block diagram of a storage area network (SAN) system.

Referring to FIG. 1, a storage system 12 is coupled to a network 16 via a storage area network 14. Storage area network 14 may be, for example, a dual-fabric system or a multi-fabric system. Each storage area network fabric may include a plurality of switches. The storage area network fabric topology may be any suitable structure such as core-edge structure, ring structure, mesh structure, and/or other structures now known or to be developed. Storage system 12 may include any suitable media, such as disk, tape, and/or structures such as redundant array of inexpensive disks (RAID). Network 16 may include local area network (LAN), wide area network (WAN), another storage area network or a combination of computer networks. In one embodiment, network 16 may support systems and applications for semiconductor manufacturing, web-based designing, customer ordering system, manufacturing control and management, vendor support, and information-sharing among the various groups. In another embodiment, network 16 may support a virtual fab, as further described below with reference to FIG. 5.

In a storage area network 14, hubs and/or switches may be used for routing traffic. Hubs are generally used in small, entry-level environments and systems. Hubs usually cost less, but also offer a lower throughput rate than switches. Switches may be used in data intensive, high-bandwidth applications such as backup, video editing, and document scanning. Due to the redundant data paths and superior manageability, switches are generally used in storage are networks with large amounts of data in high-availability environments. As storage area networks become more heavily integrated into an enterprise's computing infrastructure, the storage area networks often include multiple switching fabrics to provide redundancy. A single switch fabric, no matter how resiliently designed, is not immune to all failures such as natural disasters, software failure, hardware failure, human error, or a combination of unforeseen events. The use of redundant fabrics may increase the level of availability, even if one of the fabrics suffers a failure.

Figure 2:
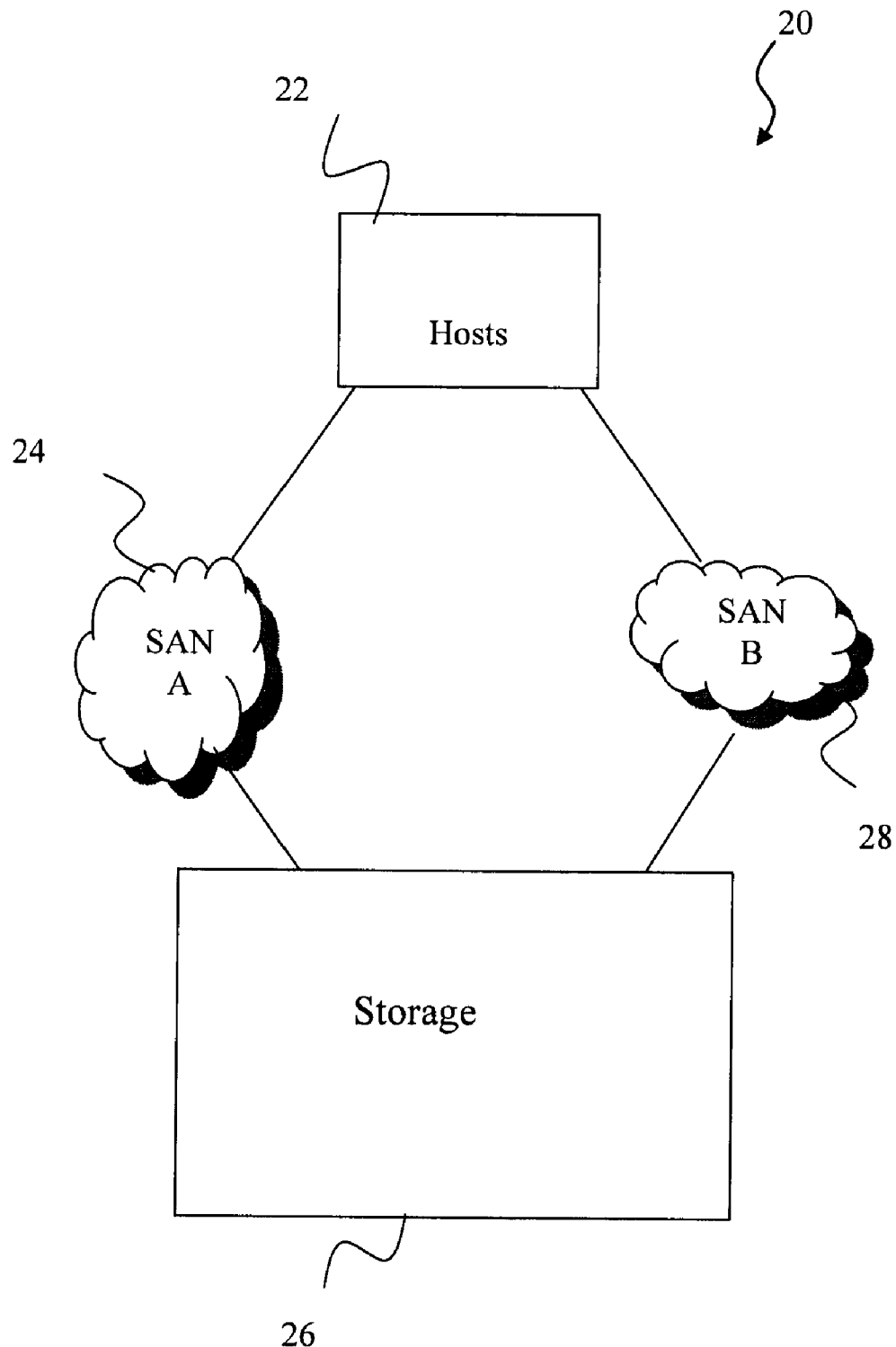
FIG. 2 is a simplified block diagram of a storage area network system.

FIG. 2 is a block diagram of a dual-fabric redundant storage area network system 20 which includes host computers or hosts 22 coupled to both a storage area network A 24, and a storage area network B 28. Storage area networks A and B are also coupled to a storage system 26. In dual-fabric storage area network system 20, both storage area network systems A and B may include switches for routing traffic. In other embodiments, system 20 may further include one or more additional storage area network systems.

Figure 3A:
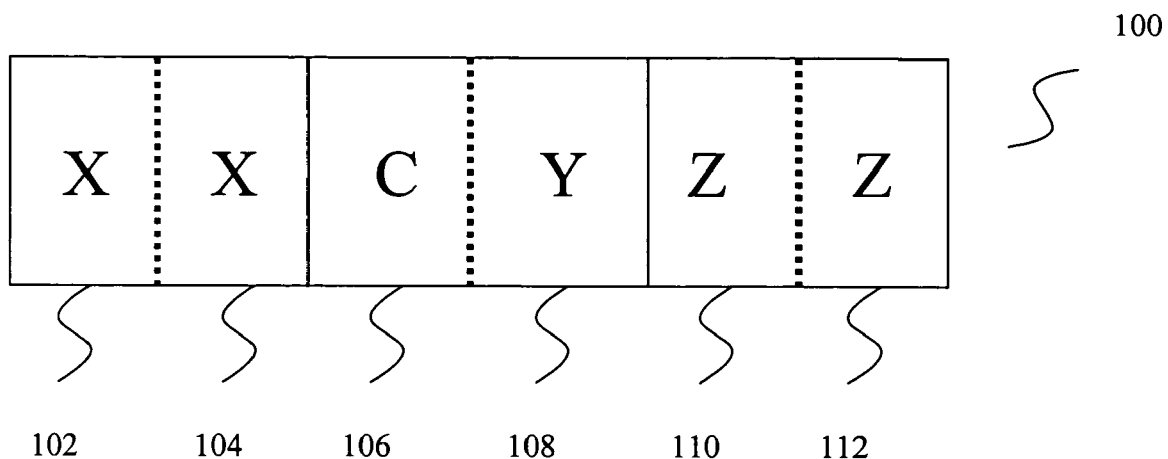
FIG. 3a is a diagram of a first storage area network switch addressing format.

An addressing mechanism used in storage area network switches is called a port identifier or PID. FIG. 3a is a diagram of a first PID address format 100 in a storage area network switch. First format 100 includes six hexadecimal digits 102-112. The first two digits 102 and 104, XX, denote the switch domain identifier. The third digit 106, C, is a constant, for example 1. The fourth digit 108, Y, is the port identifier on the switch. The last two digits 110 and 112, ZZ, are Arbitrated Loop Physical Address (ALPA), which may be used to identify a device participating in an arbitrated loop. As an example, "011A00" represents switch domain 01, port number 10, (decimal equivalent of hexadecimal value "A"), and ALPA 00. Using a single hexadecimal digit, Y, first PID format 100 is capable of addressing up to 16 ports per switch.

Figure 3B:
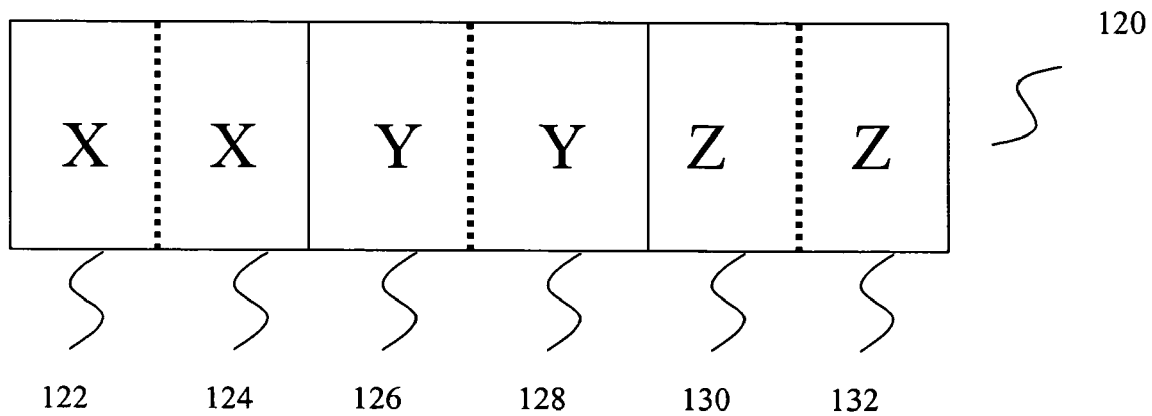
FIG. 3b is a diagram of a second storage area network switch addressing format.

A problem occurs when a storage area network that has been using 16-port switches using the first PID format needs to expand to accommodate switches with more than 16 ports that uses the second PID format. The operation of system 20 would be seriously disrupted to accommodate the address mode change. Host systems coupled to the storage area network would need to be taken offline to change over to the new addressing scheme of the larger switches. FIG. 3b is a diagram of a second PID address format 120 for a storage area network switch. Second format 120 also includes six hexadecimal digits 122-132. The first two digits 122 and 124, XX, are the switch domain identifier. The third and fourth digits 126 and 128, YY, are the port identifier on the switch. The last two digits 110 and 112, ZZ, are used for ALPA, for devices participating in an arbitrated loop. As an example, "011A00" represents switch domain 01, port number 26 (decimal equivalent of hexadecimal value "1A"), and ALPA 00. Therefore, by using two hexadecimal digits, YY, second PID format 120 is capable of addressing up to 256 ports per switch.

Figure 4:
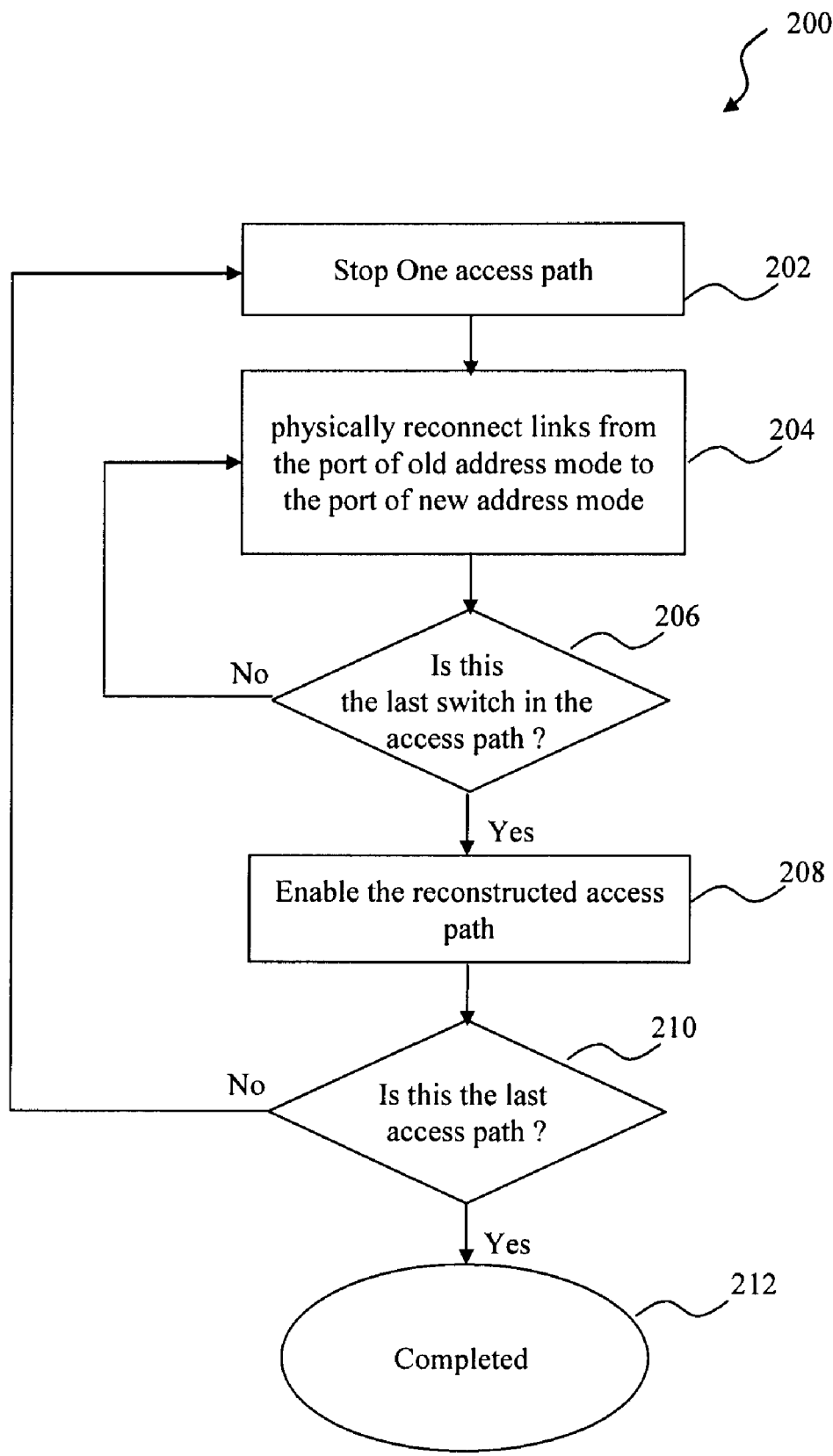
FIG. 4 is a flowchart of a method to enable a new addressing format.

Referring to FIG. 4, an embodiment of a process 200 for migrating to a new storage area network switch addressing format is provided. Process 200 begins by logically stopping one access path from the host to the switch in block 202. In one embodiment, due to the redundancy of access paths, the storage area network system is still available to all hosts. In block 204, each switch in the inactivated access path is physically reconnected by shifting host connection from the port of the old address mode to the port of the new address mode.

In one embodiment, for a constant of "1" in address field 106 (FIG. 3a), for example, a host is disconnected from the original port of a switch while in the first PID format to a port of the same switch where the new port has port address 16 higher than that of the original port while in the second PID format. For example, if a host is connected to port 10 (decimal equivalent of hexadecimal value "A") of switch 01 and ALPA is 00, then the address in the first PID format is "011A00". If the host is reconnected to port 26 (decimal equivalent of hexadecimal value "1A") of the switch 01 and ALPA is 00, then the address in the second PID format is still "011A00."

In another embodiment, both addresses are the same using the new PID format and the second PID format (for a non-zero constant in field 106 in the first PID format), only the port number has changed. In this embodiment, the host could reach the storage system by using the same PID address, if such a reconnection works together while enabling the second PID format. In the embodiment of a constant of "1," a connection from host to switch in the first PID format will be shifted up and reconnected to a new port of the same switch so that the new port address is 16 higher than that of the original port.

In block 206 in FIG. 4, if all switches in the inactivated access path have been reconnected, then execution proceeds to block 208. If not, execution returns to block 204, and this step is repeated for every switch in the inactivated access path until all have been reconnected. In block 208, the reconstructed access path is enabled for the hosts. In block 210, if all access path have been reconstructed, execution proceeds to block 212. Otherwise, execution returns to block 202 to repeat the same process for every access path. Every access path will be reconstructed until all paths have been done. In block 212, process 200 is completed after all access paths have been reconstructed.

Carried out in this manner, a storage area network is operable to migrate to a different PID addressing scheme without serious disruptions and down time.

Figure 5:
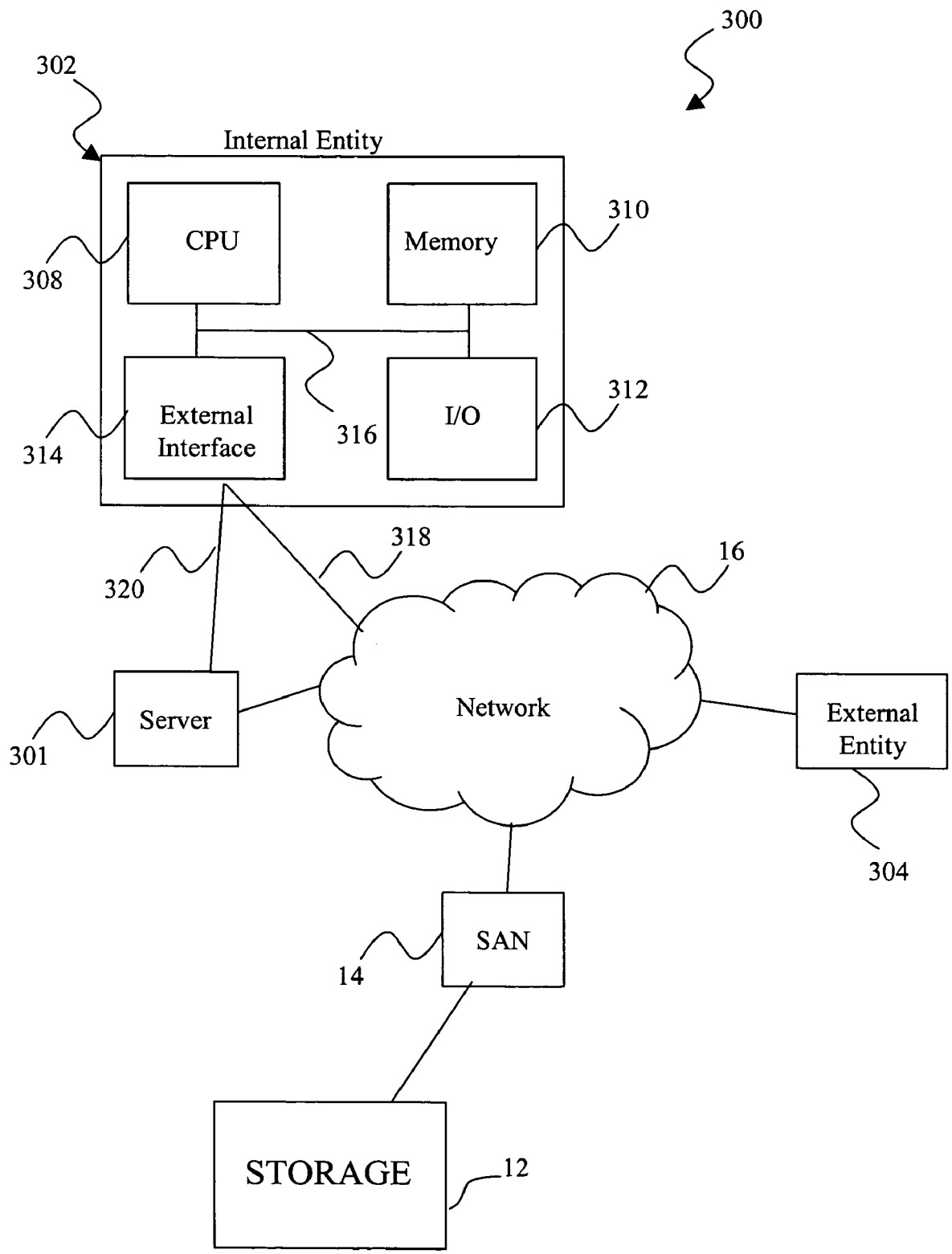
FIG. 5 is a simplified block diagram of a virtual fabrication system.

Referring now to FIG. 5, a more detailed block diagram of a virtual IC fabrication system (a "virtual fab") 300 is an example of a host and server system coupled to a storage area network 14 and storage systems 12 (FIG. 1). Virtual fab 300 includes a plurality of entities represented by one or more internal entities 302 and one or more external entities 304 that are coupled by a communications network 16. Network 16 may be a single network or may be a variety of different networks, such as an intranet and the Internet, and may include both wireline and wireless communication channels.

Each entity 302 and 304 may include one or more computing devices such as personal computers, personal digital assistants, pagers, cellular telephones, and the like. For the sake of example, internal entity 302 is expanded to show a central processing unit (CPU) 308, a memory unit 310, an input/output (I/O) device 312, and an external interface 314. The external interface may be, for example, a modem, a wireless transceiver, and/or one or more network interface cards (NICs). Components 308-314 are interconnected by a bus system 316. It is understood that internal entity 302 may be differently configured and that each of the listed components may actually represent several different components. For example, the CPU 308 may actually represent a multi-processor or a distributed processing system; memory unit 310 may include different levels of cache memory, main memory, hard disks, and remote storage locations; and the I/O device 312 may include monitors, keyboards, and the like.

Internal entity 302 may be coupled to communications network 16 through a wireless or wired link 318, and/or through an intermediate network 320, which may be further connected to the communications network. Intermediate network 320 may be, for example, a complete network or a subnet of a local area network, a company wide intranet, and/or the Internet. Internal entity 302 may be identified on one or both of the networks 16, 320 by an address or a combination of addresses, such as a MAC address associated with the network interface 314 and an IP address. Because the internal entity 302 may be connected to the intermediate network 320, certain components may, at times, be shared with other internal entities. Therefore, a wide range of flexibility is anticipated in the configuration of the internal entity 302. Furthermore, it is understood that, in some implementations, a server 301 may be provided to support multiple internal entities 302. In other implementations, a combination of one or more servers and computers may together represent a single entity.

In the present example, internal entities 302 represents those entities that are directly responsible for producing the end product, such as a wafer or individually tested IC devices. Examples of internal entities 302 include an engineer, customer service personnel, an automated system process, a design or fabrication facility and fab-related facilities such as raw-materials, shipping, assembly or test. Examples of external entities 304 include a customer, a design provider, and other facilities that are not directly associated or under the control of the fab. In addition, additional fabs and/or virtual fabs can be included with the internal or external entities. Each entity may interact with other entities and may provide services to and/or receive services from the other entities.

It is understood that entities 302, 304 may be concentrated at a single location or may be distributed, and that some entities may be incorporated into other entities. In addition, each entity 302, 304 may be associated with system identification information that allows access to information within the system to be controlled based upon authority levels associated with each entities identification information.

One or more of the services provided by the virtual fab 300 may enable collaboration and information access in such areas as design, engineering, and logistics. For example, in the design area, the customer 304 may be given access to information and tools related to the design of their product via the fab 302. The tools may enable the customer 304 to perform yield enhancement analyses, view layout information, and obtain similar information. In the engineering area, the engineer 302 may collaborate with other engineers 302 using fabrication information regarding pilot yield runs, risk analysis, quality, and reliability. The logistics area may provide the customer 304 with fabrication status, testing results, order handling, and shipping dates. It is understood that these areas are exemplary, and that more or less information may be made available via the virtual fab 300 as desired.

The present disclosure has been described relative to several alternative embodiments. Improvements or modifications that become apparent to persons of ordinary skill in the art only after reading this disclosure are deemed within the spirit and scope of the application. The present disclosure may be applied and implemented on varieties of areas and technologies such as computer integrated manufacturing, on-line library, online order system, and information technologies. It is understood that several modifications, changes and substitutions are intended in the foregoing disclosure and in some instances some features of the disclosure may be employed without a corresponding use of other features. Accordingly, it is appropriate that the appended claims be construed broadly, and not limited to the scope of the disclosure.

What is claimed is:

1. A method comprising:
   providing a storage area network that includes a first switch that uses a first address format, wherein the first address format comprises a constant and a one-digit hexadecimal port number, wherein the constant comprises a number K, wherein the port number of the first address format comprises a number N, and wherein the number N is between 0 and 15; transforming switches in the storage area network to accommodate a second switch that uses a second address format different from the first address format, wherein the transforming includes:
   logically disconnecting from a first port of the first switch addressed by a predetermined address of the first address format;
   connecting to a second port of the first switch addressed by the predetermined address if the second address format is used; and
   accessing the second port using the predetermined address in the second address format without using the first address format, wherein accessing the second port comprises using the second address format having a two-digit hexadecimal port number, and wherein the port number of the second address format comprises a number N+(16*K); and repeating the method for every switch in an access path of the first switch.

2. The method of claim 1, wherein the constant comprises the number 1.

3. The method of claim 1, wherein the port number of the first address format comprises a number N, and the port number of the second address format comprises a number N+16.

4. The method of claim 3, wherein the number N is between 0 and 15.

5. The method of claim 1, further comprising stopping an access path to the first switch prior to disconnecting from the first port of the first switch.

6. The method of claim 1, further comprising repeating the method for every switch in every access path of the first switch.

7. A method comprising
   providing a storage area network that includes a first switch that uses a first addressing format, wherein the first addressing format includes a constant and a one-digit hexadecimal port number, wherein the constant includes a number K, wherein the port number of the first addressing format includes a number N, wherein the number N is between 0 and 15; transforming switches in the storage area network to accommodate a second switch that uses a second addressing format different from the first addressing format, wherein the second addressing format includes a two-digit hexadecimal port number, wherein the port number of the second addressing format includes a number N+(16*K), wherein the transforming includes: logically stopping an access path from a host to the first switch in the access path; logically disconnecting from ports of the first switch addressed by addresses of the first addressing format and connecting to ports addressed by the same addresses if the second addressing format is used; and
   logically enabling the access path and addressing the ports of the first switch using the second addressing format; wherein the host uses the addresses for addressing the ports of the first switch in the second addressing format without using the first addressing format; and repeating the method for every switch in an access path of the first switch.

8. The method of claim 7, wherein the constant includes the number 1.

9. The method of claim 7, wherein the port number of the first addressing format includes a number N, and the port number of the second addressing format includes a number N+16.

10. The method of claim 9, wherein the number N is between 0 and 15.

* * * * *